United States Patent
Ye et al.

(10) Patent No.: US 10,139,532 B2
(45) Date of Patent: Nov. 27, 2018

(54) CAMERA MODULE AND TERMINAL

(71) Applicant: Huawei Technologies Co., Ltd., Shenzhen (CN)

(72) Inventors: Haishui Ye, Shanghai (CN); Feng Yu, Yokohama (JP); Tateoka Susumu, Yokohama (JP)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/568,202

(22) PCT Filed: Jul. 24, 2015

(86) PCT No.: PCT/CN2015/085113
§ 371 (c)(1),
(2) Date: Oct. 20, 2017

(87) PCT Pub. No.: WO2017/015801
PCT Pub. Date: Feb. 2, 2017

(65) Prior Publication Data
US 2018/0100957 A1    Apr. 12, 2018

(51) Int. Cl.
*G02B 5/20* (2006.01)
*G02B 1/11* (2015.01)
(Continued)

(52) U.S. Cl.
CPC .............. *G02B 5/208* (2013.01); *G02B 1/11* (2013.01); *G02B 1/118* (2013.01); *G02B 5/0294* (2013.01); *H04N 5/211* (2013.01); *H04N 5/2176* (2013.01)

(58) Field of Classification Search
CPC .......... G02B 5/208; G02B 1/11; G02B 1/118; G02B 5/0294; H04N 5/211; H04N 5/2176
See application file for complete search history.

(56) References Cited

U.S. PATENT DOCUMENTS

2003/0002151 A1*  1/2003  Yano ................. H04N 5/74
                                                    359/443
2007/0285555 A1   12/2007  Chen
(Continued)

FOREIGN PATENT DOCUMENTS

CN      1371010 A      9/2002
CN    101086546 A     12/2007
(Continued)

OTHER PUBLICATIONS

Machine Translation and Abstract of Chinese Publication No. CN1371010, Sep. 25, 2002, 10 pages.
(Continued)

*Primary Examiner* — Twyler Haskins
*Assistant Examiner* — Fayez Bhuiyan
(74) *Attorney, Agent, or Firm* — Conley Rose, P.C.

(57) ABSTRACT

A camera module includes a cover window, an infrared cut-off filter, and an anti-reflection coating. The anti-reflection coating is on at least one surface, through which light passes, of the optical protection window, or the anti-reflection coating is on at least one surface, through which light passes, of the infrared cut-off filter. The anti-reflection coating includes conical anti-reflection structures. A bottom diameter of the conical anti-reflection structure is 40 nm to 150 nm. A top diameter of the conical anti-reflection structure is 0% to 30% of the bottom diameter. A height of the conical anti-reflection structure is 150 nm to 300 nm. A spacing between two adjacent conical anti-reflection structures is ⅕ to ⅓ of a wavelength in a visible light band.

20 Claims, 4 Drawing Sheets

(51) Int. Cl.
*G02B 5/02* (2006.01)
*H04N 5/21* (2006.01)
*H04N 5/217* (2011.01)
*G02B 1/118* (2015.01)

(56) References Cited

U.S. PATENT DOCUMENTS

| | | |
|---|---|---|
| 2010/0110552 A1 | 5/2010 | Nakazawa et al. |
| 2010/0290133 A1 | 11/2010 | Sano et al. |
| 2010/0291317 A1 | 11/2010 | Imaoku et al. |
| 2011/0014499 A1 | 1/2011 | Uchida et al. |
| 2012/0232182 A1 | 9/2012 | Zhu et al. |
| 2014/0211302 A1 | 7/2014 | Hatashita et al. |
| 2015/0085369 A1 | 3/2015 | Tazawa et al. |
| 2015/0103226 A1 | 4/2015 | Takahashi et al. |
| 2015/0160377 A1 | 6/2015 | Kuroda et al. |
| 2015/0316702 A1* | 11/2015 | Ilmonen ............ G02F 1/133603 362/606 |
| 2018/0172510 A1* | 6/2018 | Rosen ................... G01J 3/0256 |

FOREIGN PATENT DOCUMENTS

| | | |
|---|---|---|
| CN | 101620377 A | 1/2010 |
| CN | 101639558 A | 2/2010 |
| CN | 101909858 A | 12/2010 |
| CN | 101923279 A | 12/2010 |
| CN | 101960559 A | 1/2011 |
| CN | 102157642 A | 8/2011 |
| CN | 102169195 A | 8/2011 |
| CN | 102241136 A | 11/2011 |
| CN | 102646751 A | 8/2012 |
| CN | 103576291 A | 2/2014 |
| CN | 103698975 A | 4/2014 |
| CN | 204389721 U | 6/2015 |
| WO | 2008148462 A1 | 12/2008 |

OTHER PUBLICATIONS

Machine Translation and Abstract of Chinese Publication No. CN101620377, Jan. 6, 2010, 40 pages.
Machine Translation and Abstract of Chinese Publication No. CN101639558, Feb. 3, 2010, 14 pages.
Machine Translation and Abstract of Chinese Publication No. CN102157642, Aug. 17, 2011, 29 pages.
Machine Translation and Abstract of Chinese Publication No. CN102169195, Aug. 31, 2011, 14 pages.
Machine Translation and Abstract of Chinese Publication No. CN102241136, Nov. 16, 2011, 12 pages.
Machine Translation and Abstract of Chinese Publication No. CN102646751, Aug. 22, 2012, 14 pages.
Machine Translation and Abstract of Chinese Publication No. CN103576291, Feb. 12, 2014, 11 pages.
Machine Translation and Abstract of Chinese Publication No. CN103698975, Apr. 2, 2014, 17 pages.
Foreign Communication From a Counterpart Application, PCT Application No. PCT/CN2015/085113, English Translation of International Search Report dated Apr. 8, 2016, 2 pages.
Foreign Communication From a Counterpart Application, European Application No. 15899153.9, Extended European Search Report dated Apr. 6, 2018, 8 pages.

* cited by examiner

CAMERA MODULE AND TERMINAL

CROSS-REFERENCE TO RELATED APPLICATIONS

This application is a national stage of International Application No. PCT/CN2015/085113, filed on Jul. 24, 2015, which is hereby incorporated by reference in its entirety.

TECHNICAL FIELD

Embodiments of the present disclosure relate to the field of photography technologies, and in particular, to a camera module and a terminal.

BACKGROUND

Ghosts and flare are important indicators for camera quality evaluation, and are comprehensive manifestations of stray light on an image sensor in an imaging system. Formation of the stray light includes but is not limited to energy generated by a single time or multiple times of light reflection on an optical element, a mechanical structural element, or an image sensor. Ghosts and flare mean that bright rings, dots, flecks, or the like may easily appear on a photographed image when a user performs photographing towards a streetlight, morning sunshine, afternoon sunlight, or the setting sun, and the rings, dots, flecks, or the like are vividly referred to as ghosts and flare. Existence of ghosts and flare affects beauty of a picture.

Ghosts and flare are harmful to some extent. For example, in a high-power laser system, ghosts are formed after energy generated by specular reflection of light is concentrated, causing laser damage to a surface or an internal structure of a system element. Ghosts and flare also have artistry. For example, ghosts and flare are also relatively common in a photographic system. A superior-quality single-lens reflex camera can make full use of advantages of a system structure design and appropriately adjust a surface type, a thickness, and an aperture of a lens, a lens cone structure, and the like, so that ghosts and flare achieve optimum artistry. However, for a smart terminal with a compact structure, such as a mobile phone, a bright ring or dot on a picture spoils beauty of the picture. This problem annoys users.

In a design process of an optical system, causes of ghosts and flare usually need to be analyzed, and propagation paths of stray light need to be cut off in optical design and structural design, so as to achieve an optimum inhibition effect. However, for a camera system of a mobile phone, because a mobile phone is increasingly light and thin and has an extremely compact structure nowadays, space left for a camera system of the mobile phone is limited. In the camera system of the mobile phone with a compact structure, ghost and flare correction methods are limited; moreover, many products on the market have a problem of ghosts and flare to varying degrees. This becomes one of important factors that limit improvement of mobile-phone photographing quality.

SUMMARY

Embodiments of the present disclosure provide a camera module and a terminal, where an anti-reflection coating is fabricated on at least one surface of a cover window of the camera module or on at least one surface of an infrared cut-off filter of the camera module. This can reduce light reflection and effectively inhibit a problem of ghosts and flare in photographing.

According to a first aspect, a camera module is provided, where the camera module includes a cover window, an infrared cut-off filter, and an anti-reflection coating; the anti-reflection coating is on at least one surface, through which light passes, of the optical protection window, or the anti-reflection coating is on at least one surface, through which light passes, of the infrared cut-off filter; the anti-reflection coating includes conical anti-reflection structures; a bottom diameter of the conical anti-reflection structure is 40 m to 150 nm; a top diameter of the conical anti-reflection structure is 0% to 30% of the bottom diameter; a height of the conical anti-reflection structure is 150 nanometer (nm) to 300 nm; and a spacing between two adjacent conical anti-reflection structures is ⅕ to ⅓ of a wavelength in a visible light band.

With reference to the first aspect, in a first possible implementation manner of the first aspect, that the anti-reflection coating is on at least one surface, through which light passes, of the optical protection window. The light passes through a first surface of the optical protection window and a second surface opposite to the first surface, and the anti-reflection coating is on either the first surface or the second surface or both.

With reference to the first possible implementation manner of the first aspect, in a second possible implementation manner of the first aspect, a refractive index of a material of the anti-reflection coating is close to a refractive index of a material of the optical protection window.

With reference to the second possible implementation manner of the first aspect, in a third possible implementation manner of the first aspect, the material of the optical protection window is Gorilla Glass, and the material of the anti-reflection coating is transparent ultraviolet-curable resin or transparent heat-curable resin.

With reference to the second possible implementation manner of the first aspect, in a fourth possible implementation manner of the first aspect, the material of the optical protection window is a sapphire material, and the refractive index of the material of the anti-reflection coating is from 1.68 to 1.76.

With reference to the second possible implementation manner of the first aspect, in a fifth possible implementation manner of the first aspect, the material of the optical protection window is a transparent organic material.

With reference to any one of the first aspect, or the first to the fifth possible implementation manners of the first aspect, in a sixth possible implementation manner of the first aspect, a light transmittance of the material of the optical protection window in a visible light band is not less than 90%.

With reference to the first aspect, in a seventh possible implementation manner of the first aspect, that the anti-reflection coating is on at least one surface, through which light passes, of the infrared cut-off filter. The light passes through a third surface of the infrared cut-off filter and a fourth surface opposite to the third surface, and the anti-reflection coating is on either the third surface or the fourth surface or both.

With reference to the seventh possible implementation manner of the first aspect, in an eighth possible implementation manner of the first aspect, a refractive index of a material of the anti-reflection coating is close to a refractive index of a material of the infrared cut-off filter.

With reference to any one of the first aspect, or the first to the eighth possible implementation manners of the first aspect, in a ninth possible implementation manner of the first aspect, the anti-reflection coating further includes a residual layer, the residual layer and the conical anti-reflection structures are integrated into a whole, and a thickness of the residual layer is less than or equal to 200 nm.

According to a second aspect, a camera module is provided, where the camera module includes at least one lens and an anti-reflection coating; the anti-reflection coating is on at least one flat surface, through which light passes, of the at least one lens; the anti-reflection coating includes conical anti-reflection structures; a bottom diameter of the conical anti-reflection structure is 40 m to 150 nm; a top diameter of the conical anti-reflection structure is 0% to 30% of the bottom diameter; a height of the conical anti-reflection structure is 150 nm to 300 nm; and a spacing between two adjacent conical anti-reflection structures is ⅕ to ⅓ of a wavelength in a visible light band.

With reference to the second aspect, in a first possible implementation manner of the second aspect, the anti-reflection coating further includes a residual layer, the residual layer and the conical anti-reflection structures are integrated into a whole, and a thickness of the residual layer is less than or equal to 200 nm.

According to a third aspect, a terminal is provided, where the terminal includes the camera module described in any one of the first aspect, the first to the ninth possible implementation manners of the first aspect, or the second aspect.

According to a fourth aspect, a terminal is provided, where the terminal includes a display screen, a camera module, a processor, and a memory; the camera module includes a cover window, an infrared cut-off filter, and an anti-reflection coating; the anti-reflection coating is on at least one surface, through which light passes, of the optical protection window, or the anti-reflection coating is on at least one surface, through which light passes, of the infrared cut-off filter; the anti-reflection coating includes conical anti-reflection structures; a bottom diameter of the conical anti-reflection structure is 40 m to 150 nm; a top diameter of the conical anti-reflection structure is 0% to 30% of the bottom diameter; a height of the conical anti-reflection structure is 150 nm to 300 nm; and a spacing between two adjacent conical anti-reflection structures is ⅕ to ⅓ of a wavelength in a visible light band.

With reference to the fourth aspect, in a first possible implementation manner of the fourth aspect, that the anti-reflection coating is on at least one surface, through which light passes, of the optical protection window. The light passes through a first surface of the optical protection window and a second surface opposite to the first surface, and the anti-reflection coating is on either the first surface or the second surface or both.

With reference to the first possible implementation manner of the fourth aspect, in a second possible implementation manner of the fourth aspect, a refractive index of a material of the anti-reflection coating is close to a refractive index of a material of the optical protection window.

With reference to the second possible implementation manner of the fourth aspect, in a third possible implementation manner of the fourth aspect, the material of the optical protection window is Gorilla Glass, and the material of the anti-reflection coating is transparent ultraviolet-curable resin or transparent heat-curable resin.

With reference to the second possible implementation manner of the fourth aspect, in a fourth possible implementation manner of the fourth aspect, the material of the optical protection window is a sapphire material, and the refractive index of the material of the anti-reflection coating is from 1.68 to 1.76.

With reference to the second possible implementation manner of the fourth aspect, in a fifth possible implementation manner of the fourth aspect, the material of the optical protection window is a transparent organic material.

With reference to any one of the fourth aspect, or the first to the fifth possible implementation manners of the fourth aspect, in a sixth possible implementation manner of the fourth aspect, a light transmittance of the material of the optical protection window in a visible light band is not less than 90%.

With reference to the fourth aspect, in a seventh possible implementation manner of the fourth aspect, that the anti-reflection coating is on at least one surface, through which light passes, of the infrared cut-off filter. The light passes through a third surface of the infrared cut-off filter and a fourth surface opposite to the third surface, and the anti-reflection coating is on either the third surface or the fourth surface or both.

With reference to the seventh possible implementation manner of the fourth aspect, in an eighth possible implementation manner of the fourth aspect, a refractive index of a material of the anti-reflection coating is close to a refractive index of a material of the infrared cut-off filter.

With reference to any one of the fourth aspect, or the first to the eighth possible implementation manners of the fourth aspect, in a ninth possible implementation manner of the fourth aspect, the anti-reflection coating further includes a residual layer, the residual layer and the conical anti-reflection structures are integrated into a whole, and a thickness of the residual layer is less than or equal to 200 nm.

In the foregoing technical solutions, the embodiments of the present disclosure provide a camera module and a terminal, where the camera module includes a cover window, an infrared cut-off filter, and an anti-reflection coating; the anti-reflection coating is on at least one surface, through which light passes, of the optical protection window, or the anti-reflection coating is on at least one surface, through which light passes, of the infrared cut-off filter; the anti-reflection coating includes conical anti-reflection structures; a bottom diameter of the conical anti-reflection structure is 40 m to 150 nm; a top diameter of the conical anti-reflection structure is 0% to 30% of the bottom diameter; a height of the conical anti-reflection structure is 150 nm to 300 nm; and a spacing between two adjacent conical anti-reflection structures is ⅕ to ⅓ of a wavelength in a visible light band. The camera module that has the anti-reflection coating can reduce light reflection and effectively inhibit a problem of ghosts and flare in photographing.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and persons of ordinary skill in the art may still derive other drawings from these accompanying drawings without creative efforts.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. The described embodiments are some rather than all of the embodiments of the present disclosure. All other embodiments obtained by persons of ordinary skill in the art based on the embodiments of the present disclosure without creative efforts shall fall within the protection scope of the present disclosure.

When ordinal numbers, such as "first" and "second", are mentioned in the embodiments of the present disclosure, the ordinal numbers should be understood as merely for differentiation unless, according to a context, they indeed indicate a sequence.

When "and/or", for example, "A and/or B", is mentioned in the embodiments of the present disclosure, three cases are included: A, B, and A and B.

All ranges mentioned in the embodiments of the present disclosure include endpoint values unless otherwise specified.

A terminal in the embodiments of the present disclosure includes but is not limited to a mobile phone, a notebook computer, a tablet computer, and a wearable device.

Currently, with improvement of sensor and lens design, a photographing capability of a smart terminal has achieved significant performance improvement. However, obvious ghosts and flare still exist when the smart terminal, such as a mobile phone, performs photographing under the condition of an intense light source, for example, towards the sun on a sunny day or a streetlight in the evening. This affects photographing quality. In addition, a user easily perceives interference from ghosts and flare during photographing.

A generation mechanism of ghosts and flare is that stray light reflected on a surface of an optical element or a mechanical component in a camera module focuses on a target surface of an image sensor, forming ghosts and flare. One solution to a problem of ghosts and flare is to fabricate a low-reflectivity anti-reflection coating on a surface of an element of the camera module, so as to reduce energy of stray light. For example, technical processing of a low-reflection coating is performed on a surface of a cover window and/or a surface of an infrared cut-off filter by means of nanoimprinting, or the anti-reflection coating may be fabricated on a flat surface of a lens of the camera module.

Figure 1:
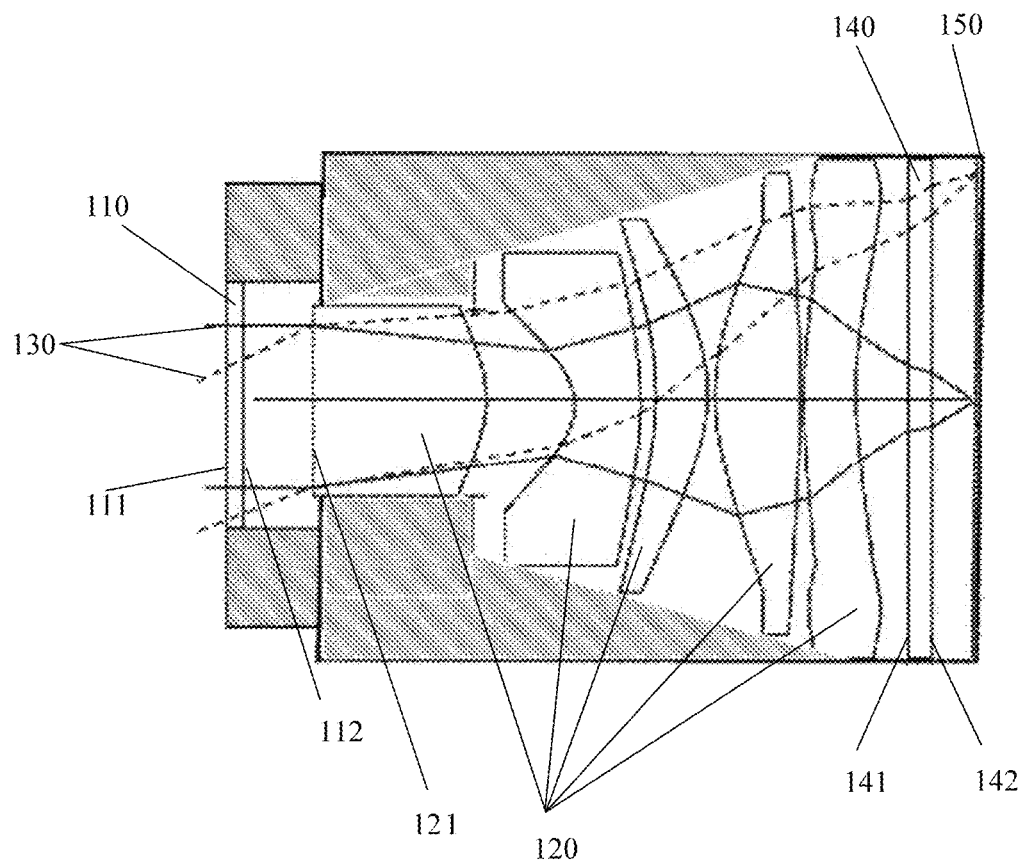
FIG. 1 is a general schematic structural diagram of a camera module.

A general structure of a camera module of a smart terminal, such as a mobile phone, a notebook computer, a tablet computer, or a wearable device, that includes the camera module is shown in FIG. 1, including a cover window 110, at least one lens 120, an infrared cut-off filter (IRCF) 140, and an image sensor 150.

A material of the cover window (optical protection window) 110 may be glass, for example, Corning's Gorilla Glass, may be a sapphire material, or may be a transparent organic material.

A structure and a quantity of the at least one lens 120 shown in FIG. 1 are merely for a purpose of illustration. A specific lens structure and lens quantity in the camera module depend on a specific situation.

The infrared cut-off filter 140 is an optical lens that can be passed through by visible light and that can cut off or reflect infrared light, and is a type of filter used for filtering out an infrared band. A material of the infrared cut-off filter may be a type of blue glass.

The image sensor 150 mainly includes a charge coupled device (CCD) and a complementary metal-oxide-semiconductor (CMOS). There are two types: an active pixel sensor.

In FIG. 1, 130 represents illustrative propagation paths of incident light at different angles in the camera module. Before reaching the image sensor 150, light 130 needs to pass through the optical protection window 110, the at least one lens 120, and the infrared cut-off filter 140. The light 130 passes through a first surface 111 of the optical protection window 110 and a second surface 112 opposite to the first surface 111, the light 130 passes through a third surface 141 of the infrared cut-off filter 140 and a fourth surface 142 opposite to the third surface 141, and the light 130 passes through a flat surface 121 of the at least one lens 120. The at least one lens 120 may have more than one flat surface. FIG. 1 is merely an example.

When a user performs photographing using a smart terminal that has a camera module, because stray light reflected on a surface of an optical element and/or a mechanical component focuses on a target surface of an image sensor, ghosts and/or flare appear/appears on a photograph taken by the user. One solution to a problem of ghosts and/or flare is to fabricate a low-reflectivity optical coating on a surface of an element of the camera module, so as to reduce energy of stray light. For example, technical processing of an anti-reflection coating is performed on a surface of a cover window, a surface of an infrared cut-off filter, or a flat surface of a lens by means of nanoimprinting, and then, tiny protrusions that have a moth-eye structure (moth-eye) are formed on the surface of the optical protection window, the surface of the infrared cut-off filter, or the flat surface of the lens. The moth-eye structure may be a conical structure, a Gauss surface structure, or a paraboloid structure. Because reflectivities of light when the light enters different media are mainly determined by refractive indexes, according to a theory of graded refractive indexes, a case in which the light penetrates through the optical protection window and/or the infrared cut-off filter whose surfaces/surface have/has the tiny moth eye-structured protrusions is equivalent to a case in which the light penetrates through layers of materials whose refractive indexes are close to a refractive index of the light. Therefore, most of incident light at any angle and frequency can be absorbed by the tiny moth eye-structured protrusions, and only a small part of the incident light is reflected. That is, ultra-low reflection can be achieved.

Embodiment 1

A camera module provided in this embodiment of the present disclosure includes a cover window 110, an infrared cut-off filter 140, and an anti-reflection coating. The anti-reflection coating is on at least one surface, through which light passes, of the optical protection window, or the anti-reflection coating is on at least one surface, through which light passes, of the infrared cut-off filter. The anti-reflection coating includes conical anti-reflection structures. A bottom diameter of the conical anti-reflection structure is 40 m to 150 nm. A top diameter of the conical anti-reflection structure is 0% to 30% of the bottom diameter. A height of the conical anti-reflection structure is 150 nm to 300 nm. A spacing between two adjacent conical anti-reflection structures is 1/5 to 1/3 of a wavelength in a visible light band.

Figure 2:
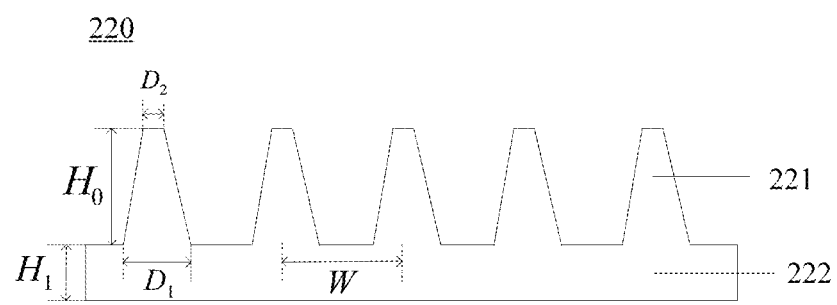
FIG. 2 is a schematic diagram of conical anti-reflection structures according to an embodiment of the present disclosure.

The conical anti-reflection structure is in the shape of a needle point or a circular cone. Because a processing technique is limited, it is extremely difficult to shape the conical anti-reflection structure into a theoretical needle-point or conical structure. FIG. 2 is a schematic diagram of an anti-reflection coating 220. The anti-reflection coating 220 includes conical anti-reflection structures 221. A bottom diameter $D_1$ of the conical anti-reflection structure 221 ranges from 40 m to 150 nm. A top diameter $D_2$ of the conical anti-reflection structure 221 is 0% to 30% of the bottom diameter $D_1$ of the conical anti-reflection structure 221. A height $H_0$ of the conical anti-reflection structure 221 ranges from 150 nm to 300 nm. A spacing W between two adjacent conical anti-reflection structures 221 is 1/5 to 1/3 of a wavelength in a visible light band. Optionally, $\alpha \geq 3$, where a represents a height to width ratio of the conical anti-reflection structure 221. The height to width ratio $\alpha = H_0/D_1$. For example, if the bottom diameter $D_1$ of the conical anti-reflection structure is 100 nm, the top diameter $D_2$ of the conical anti-reflection structure is 0 nm to 30 nm. When the top diameter $D_2$ of the conical anti-reflection structure is 0 nm, the conical anti-reflection structure approximates a theoretical cone. In order to control a height of the anti-reflection coating, optionally, the anti-reflection coating 220 further includes a residual layer 222. The residual layer 222 and the conical anti-reflection structures are integrated into a whole. A thickness $H_1$ of the residual layer 222 is less than or equal to 200 nm. With technical development, the thickness of the residual layer 222 may be 0 nm. That is, the anti-reflection coating 220 may have no residual layer 222 and include only the conical anti-reflection structures 221. Therefore, a total height H of the anti-reflection coating 220 ranges from 150 nm to 500 nm. All of the foregoing ranges include endpoint values unless otherwise specified. As shown in FIG. 2, the spacing between two adjacent conical anti-reflection structures is a distance between cone center axes of the two adjacent conical anti-reflection structures. Generally, a range of a wavelength in the visible light band that can be felt by a human eye is from 390 nm to 700 nm.

Optionally, the optical protection window 110 includes a first surface 111 and a second surface 112 opposite to the first surface 111, and the anti-reflection coating is on either the first surface 111 or the second surface 112 or both. During photographing, light 130 needs to pass through the first surface 111 and the second surface 112 of the optical protection window 110 before reaching an image sensor 150. The anti-reflection coating is on the first surface 111 and/or the second surface 112. The anti-reflection coating may be disposed only on the first surface 111 of the optical protection window 110, or may be disposed only on the second surface 112 of the optical protection window 110, or may be disposed on both the first surface 111 and the second surface 112 of the optical protection window 110. When the anti-reflection coating is disposed on both the first surface 111 and the second surface 112 of the optical protection window 110, the optical protection window 110 has a double-sided anti-reflection coating, and light reflection is better reduced. The first surface 111 may also be referred to as an outer surface of the optical protection window 110. The second surface 112 may also be referred to as an inner surface of the optical protection window 110.

Optionally, for better light transmission, a light transmittance of a material of the optical protection window in the visible light band is not less than 90%.

Optionally, a refractive index of a material of the anti-reflection coating is close to a refractive index of the material of the optical protection window. In this way, light reflection can be better reduced.

Optionally, the material of the optical protection window is Gorilla Glass, and the material of the anti-reflection coating is transparent ultraviolet (UV)-curable resin or transparent heat-curable resin. The transparent UV-curable resin may be a photo-curable acrylate adhesive (also referred to as UV-curable acrylic glue or UV acrylic adhesive). Because a refractive index of Gorilla Glass is 1.51 (a value of $N_d$), a value of a refractive index $N_d$ of a selected material of the anti-reflection coating preferably ranges from 1.48 to 1.53. The photo-curable acrylate adhesive has a refractive index from 1.48 to 1.53, and is therefore a good material for the anti-reflection coating.

Optionally, the material of the optical protection window is a sapphire material, and the refractive index of the material of the anti-reflection coating is from 1.68 to 1.76. Because a refractive index of the sapphire material is greater than 1.7, in order to achieve a low reflectivity, the refractive index of the material used for fabricating the anti-reflection coating is from 1.68 to 1.76.

Optionally, the material of the optical protection window is a transparent organic material.

Optionally, the infrared cut-off filter 140 includes a third surface 141 and a fourth surface 142 opposite to the third surface 141, and the anti-reflection coating is on either the third surface 141 or the fourth surface 142 or both. During photographing, the light 130 needs to pass through the third surface 141 and the fourth surface 142 of the infrared cut-off filter 140 before reaching the image sensor 150. The anti-reflection coating is on the third surface 141 and/or the fourth surface 142. The anti-reflection coating may be disposed only on the third surface 141 of the infrared cut-off filter 140, or may be disposed only on the fourth surface 142 of the infrared cut-off filter 140, or may be disposed on both the third surface 141 and the fourth surface 142 of the infrared cut-off filter 140. When the anti-reflection coating is disposed on both the third surface 141 and the fourth surface 142 of the infrared cut-off filter 140, the infrared cut-off filter 140 has a double-sided anti-reflection coating, and light reflection is better reduced. Optionally, the anti-reflection coating may be on both the first surface 111 and the second surface 112 of the optical protection window 110 as well as both the third surface 141 and the fourth surface 142 of the infrared cut-off filter 140. In this case, both the optical protection window 110 and the infrared cut-off filter 140 have a double-sided anti-reflection coating structure, and light reflection is better reduced.

Optionally, the refractive index of the material of the anti-reflection coating is close to a refractive index of a material of the infrared cut-off filter. In this way, light reflection can be better reduced.

Embodiment 2

This embodiment of the present disclosure provides a camera module. Tiny moth eye-structured protrusions are fabricated on a surface of a cover window of the camera module and/or on a surface of an infrared cut-off filter of the camera module, so that the camera module can reduce light reflection and effectively inhibit a problem of ghosts and flare in photographing. Before the tiny moth eye-structured protrusions are fabricated, an organic thin-film first needs to be fabricated on the surface of the optical protection window and/or the surface of the infrared cut-off filter. Then, the organic thin-film is made into an anti-reflection coating using a nanoimprint technique. The anti-reflection coating includes several tiny moth eye-structured protrusions. The tiny moth eye-structured protrusions may be conical anti-reflection structures.

Using an example in which the anti-reflection coating is fabricated on a second surface 112 of a cover window 110, the following describes specific implementation steps of fabricating the anti-reflection coating. For the optical protection window, Corning's Gorilla Glass is used as an example. The second surface 112 may also be referred to as an inner surface 112 of the optical protection window 110.

In the first step, Gorilla Glass whose shape and dimensions have been cut is cleaned. A conventional semiconductor cleaning method may be used for cleaning. For example, first, ultrasonic cleaning is performed on the Gorilla Glass using acetone; second, ultrasonic cleaning is performed on the Gorilla Glass using alcohol; finally, surface treatment is performed on the Gorilla Glass using oxygen ($O_2$) plasma.

Figure 3A:
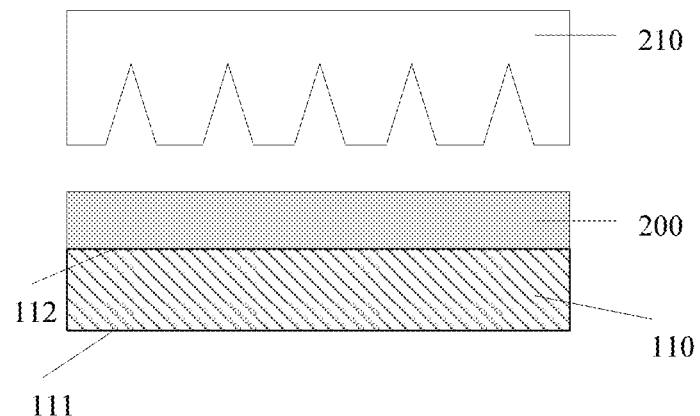
FIG. 3A is a schematic diagram of a technique for fabricating anti-reflection structures according to an embodiment of the present disclosure.

In the second step, as shown in FIG. 3A, a transparent organic thin-film 200 is fabricated on the second surface 112 of the optical protection window 110. A thickness of the organic thin-film 200 is 150 nm to 500 nm. The organic thin-film is a material for fabricating the anti-reflection coating. A technique for fabricating the organic thin-film 200 on the second surface 112 of the optical protection window 110 may be spin-coating, dipping, dispensing, or the like. The thickness of the organic thin-film is ensured by controlling a technical parameter.

Selecting an appropriate material for the organic thin-film is a key to implementing a low reflectivity of the camera module. A refractive index of the organic thin-film needs to fit a refractive index of a material of the optical protection window. Therefore, for different materials of the optical protection window, different materials need to be considered for the organic thin-film. Generally, a refractive index of Gorilla Glass is 1.51 (a value of $N_d$). Therefore, a refractive index of a selected organic thin-film needs to be close to the refractive index of Gorilla Glass. For example, a value of the refractive index $N_d$ of the selected organic thin-film as the material of the coating ranges from 1.48 to 1.53. When the material of the optical protection window is Gorilla Glass, the organic thin-film may be transparent UV-curable resin or transparent heat-curable resin. The transparent UV-curable resin may be a photo-curable acrylate adhesive. In addition, the photo-curable acrylate adhesive can meet a requirement of UV imprint. In order to fully ensure an optical transmittance, a material of the organic thin-film needs to meet a requirement that a transmittance in a visible light band is greater than 90%.

In the third step, a flexible nanoimprint mold 210 that has moth-eye structures is fabricated. The flexible mold needs to have a UV-transmitting property. A material of the flexible mold may be polydimethylsiloxane (PDMS), SU-8, acrylic resin, epoxy resin, or the like. A technique for fabricating the flexible mold is a conventional technology, and specific descriptions thereof are not provided in the present disclosure herein.

Figure 3B:
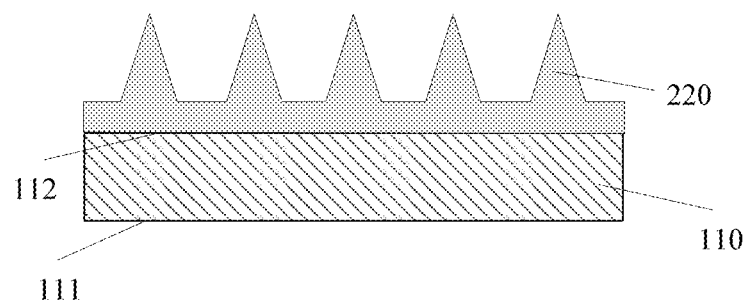
FIG. 3B is a schematic diagram of another technique for fabricating anti-reflection structures according to an embodiment of the present disclosure.

In the fourth step, UV imprint and demolding processing are performed. The flexible mold 210 prepared in the third step is situated towards the organic thin-film 200 in the second step for pressing processing, so that the moth-eye structures are transferred to the organic thin-film 200 to obtain an anti-reflection coating 220, as shown in FIG. 3B. In this process, ultraviolet UV radiation may be used to cure the organic thin-film 200. After the organic thin-film 200 is cured, the flexible mold 210 is separated from the organic thin-film 200, that is, demolding processing is performed.

By means of the foregoing four steps, the anti-reflection coating 220 can be fabricated on the second surface 112 of the optical protection window 110. With technical development, the anti-reflection coating 220 may have no residual layer 222, that is, the anti-reflection coating 220 includes only conical anti-reflection structures 221.

The anti-reflection coating 220 is a layer of thin film that has periodic conical nano-structures. The anti-reflection coating 220 facilitates reflectivity reduction. However, in a process of UV imprint and demolding, it is extremely difficult to obtain a theoretical conical structure by means of processing. Conical anti-reflection structures shown in FIG. 2 can be obtained.

Alternatively, the anti-reflection coating may be fabricated on a first surface 111 of the optical protection window 110 by performing steps similar to those in the foregoing fabrication technique. Alternatively, the anti-reflection coating may be fabricated on both the first surface 111 and the second surface 112 of the optical protection window 110. After the anti-reflection coating is fabricated on the first surface 111 and/or the second surface 112 of the optical protection window 110, the anti-reflection coating may continue to be fabricated on a third surface 141 of an infrared cut-off filter 140, or on a fourth surface 142 of the infrared cut-off filter 140, or on both the third surface 141 and the fourth surface 142 of the infrared cut-off filter 140. In the last case, both the optical protection window 110 and the infrared cut-off filter 140 have a double-sided anti-reflection coating structure, and light reflection is better reduced.

Embodiment 3

Using an example in which a material of a cover window 110 of a camera module is a sapphire material, the following provides a description about fabricating an anti-reflection coating on a sapphire glass substrate. Sapphire glass has a good thermal property, an excellent electrical property and dielectric property, and other properties, such as chemical-corrosion resistance, high-temperature resistance, good thermal conductivity, high hardness, infrared transmitting, and good chemical stability. Currently, a sapphire material is used for optical protection windows in an increasing quantity of camera modules. Because a refractive index of sapphire is greater than a refractive index of Gorilla Glass, sapphire has a greater reflectivity than Gorilla Glass does. Therefore, when a sapphire material is used for a cover window of a camera module, it is extremely necessary to process an ultralow-reflectivity coating on a surface of the sapphire material.

In this embodiment of the present disclosure, an anti-reflection coating that has periodic conical anti-reflection structures is fabricated, using a nanoimprint technique, on a surface of a cover window that is made of a sapphire material. A specific technical process thereof is similar to that in Embodiment 2. Because a refractive index of the sapphire material is greater than 1.7, in order to achieve a low reflectivity, a refractive index of a material of the coating needs to fit the refractive index of the material of the optical protection window, that is, the refractive indexes of the two materials need to be close. Therefore, the refractive index ($N_d$) of the material used for fabricating the coating that has the anti-reflection structures is preferably from 1.67 to 1.78. Because hardness of the sapphire material is relatively high, an acrylic resin or epoxy resin material whose hardness is relatively high needs to be selected for a flexible mold used for nanoimprinting the sapphire material, so as to obtain a better imprinting result. Basic parameters of the conical anti-reflection structures of the anti-reflection coating fabricated on a second surface 112 of the optical protection window 110 that is made of the sapphire material are similar to those in Embodiment 1. Optionally, the anti-reflection coating may be fabricated on a first surface 111 of the optical protection window 110 that is made of the sapphire material. Optionally, the anti-reflection coating is fabricated on both surfaces of the optical protection window that is made of the sapphire material, so as to achieve optimum reduction of light reflection.

The foregoing description about the substrate for fabricating the anti-reflection coating is specific to Gorilla Glass and sapphire. A material of an infrared cut-off filter may be blue glass. A technique for fabricating the anti-reflection coating using blue glass as a substrate is similar to the technique in Embodiment 2. Based on a similar technique, the anti-reflection coating may be fabricated on a third surface 141 and/or a fourth surface 142 of an infrared cut-off filter 140. Generally, light reflection on a surface of an optical element that is adjacent to an image sensor 180 generates greater energy than reflection on a surface of another optical element, and therefore contributes more to ghosts and flare. Because the infrared cut-off filter 140 is generally adjacent to the image sensor 180, light reflected on a surface of the infrared cut-off filter 140 is more likely to directly enter the image sensor 180 and affect image quality. Therefore, fabricating the anti-reflection coating on the surface of the infrared cut-off filter 140 can effectively inhibit "petal-like" flare and the like resulting from secondary reflection between the infrared cut-off filter 140 and the image sensor 180.

Figure 4A:
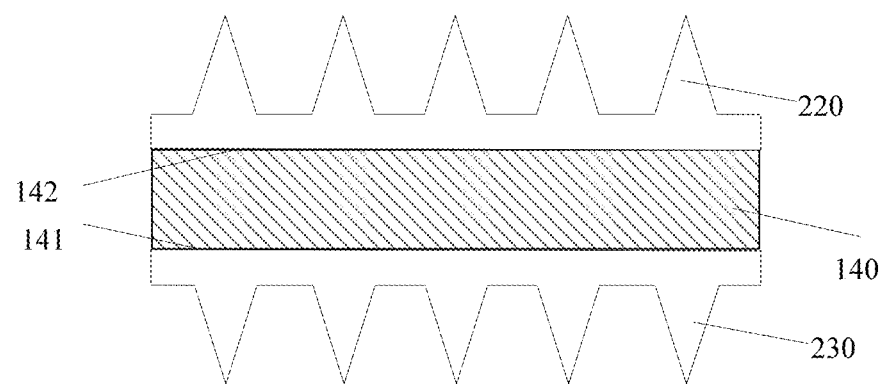
FIG. 4A is a schematic diagram of anti-reflection structures on surfaces of an optical element according to an embodiment of the present disclosure.
Figure 4B:
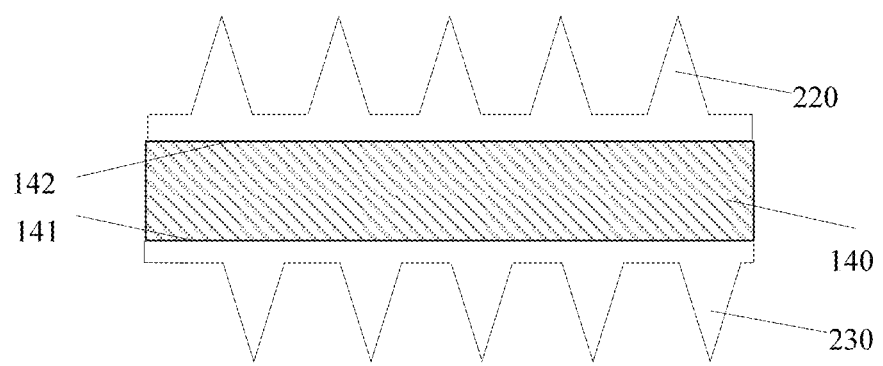
FIG. 4B is another schematic diagram of anti-reflection structures on surfaces of an optical element according to an embodiment of the present disclosure.

Optionally, the anti-reflection coating is fabricated on both surfaces of the infrared cut-off filter, that is, an anti-reflection coating 220 is fabricated on the fourth surface 142 of the infrared cut-off filter 140, and an anti-reflection coating 230 is fabricated on the third surface 141. Structure parameters of the anti-reflection coating 220 and the anti-reflection coating 230 are basically the same. As shown in FIG. 4A, a cone center axis of a conical anti-reflection structure of the anti-reflection coating 220 may coincide with a cone center axis of a conical anti-reflection structure of the anti-reflection coating 230. That is, the cone center axes of the conical anti-reflection structures are in one line. Alternatively, the cone center axes may slightly deviate from each other, as shown in FIG. 4B. Similarly, when the anti-reflection coating is fabricated on both the first surface 111 and the second surface 112 of the optical protection window 110, a cone center axis of a conical anti-reflection structure of the anti-reflection coating on the first surface 111 may coincide with or slightly deviate from a cone center axis of a conical anti-reflection structure of the anti-reflection coating on the second surface 112.

Embodiment 4

This embodiment of the present disclosure provides a camera module. The camera module includes at least one lens and an anti-reflection coating. The anti-reflection coating is on at least one flat surface, through which light passes, of the at least one lens. The anti-reflection coating includes conical anti-reflection structures. A bottom diameter of the conical anti-reflection structure is 40 m to 150 nm. A top diameter of the conical anti-reflection structure is 0% to 30% of the bottom diameter. A height of the conical anti-reflection structure is 150 nm to 300 nm. A spacing between two adjacent conical anti-reflection structures is ⅕ to ⅓ of a wavelength in a visible light band.

For example, as shown in FIG. 1, at least one lens 120 includes a flat surface 121, and the anti-reflection coating is on the flat surface 121.

Optionally, the anti-reflection coating is on at least one flat surface, through which light passes, of a cover window 110, of the at least one lens 120, or of an infrared cut-off filter 140.

Optionally, the anti-reflection coating further includes a residual layer. The residual layer and the conical anti-reflection structures are integrated into a whole. A thickness of the residual layer is less than or equal to 200 nm.

Basic parameters of the conical anti-reflection structure are similar to those in Embodiment 1. A technique for fabricating the anti-reflection coating is similar to that in Embodiment 2.

Embodiment 5

Figure 5:
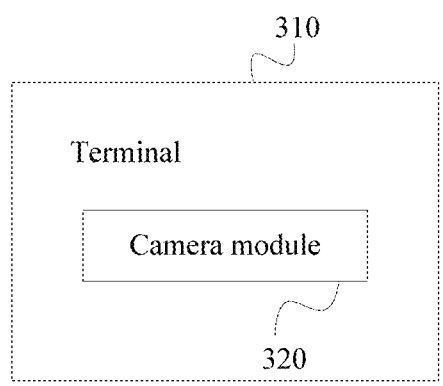
FIG. 5 is a schematic structural diagram of a terminal according to an embodiment of the present disclosure.

As shown in FIG. 5, this embodiment of the present disclosure provides a terminal 310. The terminal includes a camera module 320. The camera module 320 is the camera module in Embodiment 1 or Embodiment 4.

This embodiment of the present disclosure provides the terminal 310. The terminal 310 includes the camera module 320. The camera module 320 includes a cover window, an infrared cut-off filter, and an anti-reflection coating. The anti-reflection coating is on at least one surface, through which light passes, of the optical protection window, or the anti-reflection coating is on at least one surface, through which light passes, of the infrared cut-off filter. The anti-reflection coating includes conical anti-reflection structures. A bottom diameter of the conical anti-reflection structure is 40 m to 150 nm. A top diameter of the conical anti-reflection structure is 0% to 30% of the bottom diameter. A height of the conical anti-reflection structure is 150 nm to 300 nm. A spacing between two adjacent conical anti-reflection structures is ⅕ to ⅓ of a wavelength in a visible light band.

This embodiment of the present disclosure further provides a terminal. The terminal includes a camera module. The camera module includes at least one lens and an anti-reflection coating. The anti-reflection coating is on at least one flat surface, through which light passes, of the at least one lens. The anti-reflection coating includes conical anti-reflection structures. A bottom diameter of the conical anti-reflection structure is 40 m to 150 nm. A top diameter of the conical anti-reflection structure is 0% to 30% of the bottom diameter. A height of the conical anti-reflection structure is 150 nm to 300 nm. A spacing between two adjacent conical anti-reflection structures is ⅕ to ⅓ of a wavelength in a visible light band.

A terminal provided in this embodiment of the present disclosure includes a camera module that has an anti-reflection coating. In this way, light reflection can be reduced, and a problem of ghosts and flare in photographing can be effectively inhibited.

Embodiment 6

Figure 6:
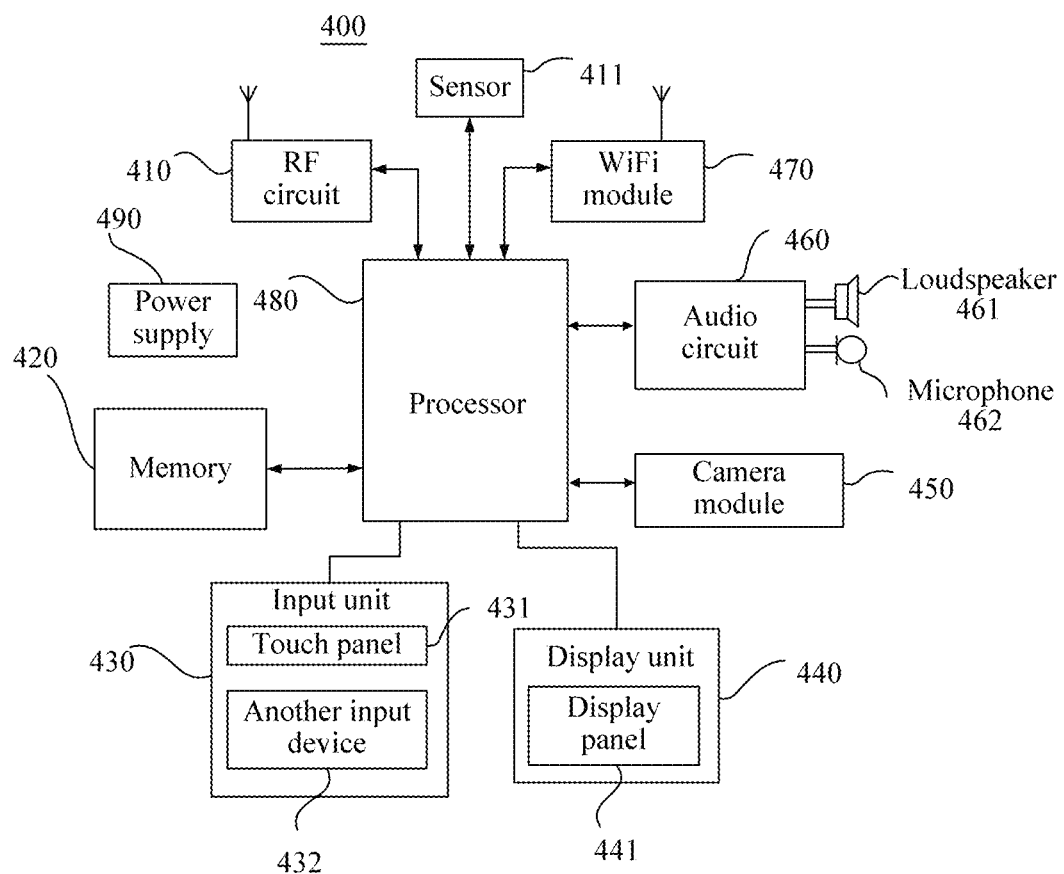
FIG. 6 is a schematic structural diagram of another terminal according to an embodiment of the present disclosure.

FIG. 6 is a schematic structural diagram of a terminal according to this embodiment of the present disclosure. The terminal may be a terminal device, such as a mobile phone, a tablet computer, a personal digital assistant (PDA), a notebook computer, or a digital camera. Using an example in which the terminal is a mobile phone, FIG. 6 shows a block diagram of a partial structure of a mobile phone 400 that is related to the terminal provided in this embodiment of the present disclosure. The mobile phone 400 includes components such as a radio frequency (RF) circuit 410, a memory 420, an input unit 430, a display unit 440, a camera module 450, an audio circuit 460, a WiFi module 470, a processor 480, and a power supply 490. Persons skilled in the art may understand that the mobile phone structure shown in FIG. 6 does not constitute any limitation on a mobile phone, and the mobile phone may include components more or fewer than those shown in the figure, or a combination of some components, or components disposed differently.

The following introduces each constituent part of the mobile phone 400 with reference to FIG. 6.

The RF circuit 410 may be configured to receive and send a signal in an information receiving and sending process or in a call process; in particular, after receiving downlink information from a base station, send the downlink information to the processor 480 for processing; and send uplink data to the base station. Generally, the RF circuit includes but is not limited to an antenna, at least one amplifier, a transceiver, a coupler, a low noise amplifier (LNA), and a duplexer. In addition, the RF circuit 410 can further communicate with a network and another device by means of wireless communication. For the wireless communication, any communications standard or protocol may be used, including but not limited to Global System of Mobile communication (GSM), general packet radio service (GPRS), Code Division Multiple Access (CDMA), Wideband Code Division Multiple Access (WCDMA), Long Term Evolution (LTE), electronic mail (Email), and short message service (SMS).

The memory 420 may be configured to store a software program and a module. The processor 480 performs various function applications and data processing of the mobile phone 400 by running the software program and the module stored in the memory 420. The memory 420 may mainly include a program storage area and a data storage area. The program storage area may store an operating system, an application program required by at least one function (for example, a voice playback function and an image playback function), and the like. The data storage area may store data (for example, audio data and a phone book) created according to use of the mobile phone 400, and the like. In addition, the memory 420 may include a high-speed random access memory, and may further include a nonvolatile memory, for example, at least one magnetic disk storage device, a flash memory device, or another volatile solid-state storage device.

The input unit 430 may be configured to receive input digital or character information and generate signal input that is related to user setting and function control of the mobile phone 400. The input unit 430 may include a touch panel 431 and another input device 432. The touch panel 431, also referred to as a touchscreen, can collect a touch operation (for example, an operation performed by a user on the touch panel 431 or near the touch panel 431 using any proper object or accessory, such as a finger or a stylus) performed by the user on or near the touch panel 431, and drive a corresponding connection apparatus according to a preset program. Optionally, the touch panel 431 may include two parts: a touch detection apparatus and a touch controller. The touch detection apparatus detects a location touched by the user, detects a signal brought by the touch operation, and transmits the signal to the touch controller. The touch controller receives touch information from the touch detection apparatus, converts the touch information into touch point coordinates, and sends the touch point coordinates to the processor 480. The touch controller can also receive and execute a command sent by the processor 480. In addition, the touch panel 431 may be implemented using multiple types, such as a resistive type, a capacitive type, an infrared type, and a surface acoustic wave type. In addition to the touch panel 431, the input unit 430 may further include the another input device 432. The another input device 432 may include but is not limited to one or more of a physical keyboard, a function key (for example, a volume control key or a switch key), a trackball, a mouse, or a joystick.

The display unit 440 may be configured to display information that is input by the user, or information provided for the user, and various menus of the mobile phone 400. The display unit 440 may include a display panel 441. Optionally, the display panel 441 may be configured in a form of a liquid crystal display (LCD), an organic light-emitting diode (OLED), or the like. The display panel 441 may also be referred to as a display screen. Further, the touch panel 431 may cover the display panel 441. After detecting a touch operation on or near the touch panel 431, the touch panel 431 transmits information about the touch operation to the processor 480 to determine a touch event type. Then, the processor 480 provides corresponding visual output on the display panel 441 according to the touch event type. In FIG. 6, the touch panel 431 and the display panel 441 are used as two independent parts to implement input and output functions of the mobile phone 400. However, in some embodiments, the touch panel 431 and the display panel 441 may be integrated to implement the input and output functions of the mobile phone 400.

The mobile phone 400 may further include at least one sensor 411, such as a light sensor, a motion sensor, or another sensor. The light sensor may include an ambient light sensor and a proximity sensor. The ambient light sensor can adjust a luminance of the display panel 441 according to intensity of ambient light. The proximity sensor can turn off the display panel 441 and/or backlight when the mobile phone 400 moves close to an ear. As a type of motion sensor, an accelerometer sensor can detect values of acceleration in various directions (generally three axes), can detect, in a still state, a value and a direction of gravity, and can be used for an application that identifies a mobile phone posture (for example, screen switch between a landscape mode and a portrait mode, a related game, and magnetometer posture calibration), a function (for example, a pedometer or tapping) related to vibration identification, and the like. For other sensors, such as a gyroscope, a barometer, a hygrometer, a thermometer, and an infrared sensor, that may further be configured in the mobile phone 400, details are not described herein.

The audio circuit 460, a loudspeaker 461, and a microphone 462 can provide an audio interface between the user and the mobile phone 400. The audio circuit 460 can transmit, to the loudspeaker 461, an electrical signal that is obtained after received audio data is converted. The loudspeaker 461 converts the electrical signal into a voice signal and outputs the voice signal. In addition, the microphone 462 converts a collected voice signal into an electrical signal, and the audio circuit 460 receives the electrical signal, converts the electrical signal into audio data, and outputs the audio data to the processor 480 for processing.

Then, processed audio data is sent to, for example, another mobile phone, by means of the RF circuit 410, or the audio data is output to the memory 420 for further processing.

WiFi belongs to a short-distance wireless transmission technology. Using the WiFi module 470, the mobile phone 400 can help the user receive and send an email, browse a web page, access streaming media, and the like. The WiFi module 470 provides wireless access to the broadband Internet for the user. Although FIG. 6 shows the WiFi module 470, it can be understood that the WiFi module 470 is not a necessary constituent of the mobile phone 400 and may completely be omitted as required without changing the essence of the present disclosure.

The processor 480 is a control center of the mobile phone 400, is connected to all the parts of the entire mobile phone using various interfaces and lines, and performs various functions of the mobile phone 400 and data processing by running or executing the software program and/or the module that are/is stored in the memory 420 and by invoking data stored in the memory 420, so as to perform overall monitoring on the mobile phone. Optionally, the processor 480 may include one or more processing units. Preferably, an application processor and a modem processor may be integrated into the processor 480. The application processor mainly processes the operating system, a user interface, an application program, and the like. The modem processor mainly processes wireless communication. It can be understood that the modem processor may alternatively not be integrated into the processor 480.

The mobile phone 400 further includes the power supply 490 (for example, a battery) that supplies power to all the parts. Preferably, the power supply may be logically connected to the processor 480 using a power management system, so as to implement such functions as charge management, discharge management, and power consumption management using the power management system.

Although not shown, a Bluetooth® module and the like may be included in the mobile phone 400. Details are not described herein.

A terminal provided in this embodiment of the present disclosure includes a display screen 441, a camera module 450, a processor 480, and a memory 420.

The camera module 450 includes a cover window, an infrared cut-off filter, and an anti-reflection coating.

The anti-reflection coating is on at least one surface, through which light passes, of the optical protection window, or the anti-reflection coating is on at least one surface, through which light passes, of the infrared cut-off filter.

The anti-reflection coating includes conical anti-reflection structures.

A bottom diameter of the conical anti-reflection structure is 40 m to 150 nm. A top diameter of the conical anti-reflection structure is 0% to 30% of the bottom diameter. A height of the conical anti-reflection structure is 150 nm to 300 nm. A spacing between two adjacent conical anti-reflection structures is ⅕ to ⅓ of a wavelength in a visible light band.

The display screen 441 may further be configured to display, for a user, a picture or video photographed by the camera module 450. The memory 420 may further be configured to store the picture or video photographed by the camera module 450.

Optionally, the camera module 450 may be the camera module in Embodiment 1 or Embodiment 4.

A terminal provided in this embodiment of the present disclosure includes a display screen, a processor, a memory, and a camera module that has an anti-reflection coating. In this way, light reflection can be reduced, and a problem of ghosts and flare in photographing can be effectively inhibited.

Finally, it should be noted that the foregoing embodiments are merely examples intended to describe the technical solutions of the present disclosure, but are not intended to limit the present disclosure. Although the present disclosure and beneficial effects brought by the present disclosure are described in detail with reference to the foregoing embodiments, persons of ordinary skill in the art should understand that they may still make modifications to the technical solutions described in the foregoing embodiments or make equivalent replacements to some technical features thereof, without departing from the scope of the claims of the present disclosure.

What is claimed is:

1. A camera module, comprising:
   a cover window at a first end of the camera module;
   an infrared cut-off filter at a second end of the camera module; and
   an anti reflection coating,
   wherein the anti-reflection coating is on at least one surface, through which light passes, of the cover window, or the anti-reflection coating is on at least one surface, through which light passes, of the infrared cut-off filter,
   wherein the anti-reflection coating comprises conical anti-reflection structures,
   wherein a bottom diameter of the conical anti-reflection structure is 40 nm to 150 nm,
   wherein a top diameter of the conical anti-reflection structure is 0% to 30% of the bottom diameter,
   wherein a height of the conical anti-reflection structure is 150 nm to 300 nm, and
   wherein a spacing between two adjacent conical anti-reflection structures is ⅕ to ⅓ of a wavelength in a visible light band.

2. The camera module according to claim 1, wherein when the anti-reflection coating is on the at least one surface of the cover window, the light passes through a first surface of the cover window and a second surface opposite to the first surface, and wherein the anti-reflection coating is on either the first surface or the second surface or both.

3. The camera module according to claim 2, wherein a refractive index of a material of the anti-reflection coating is close to a refractive index of a material of the cover window.

4. The camera module according to claim 3, wherein the material of the cover window is Gorilla Glass, and wherein the material of the anti-reflection coating is transparent ultraviolet-curable resin or transparent heat-curable resin.

5. The camera module according to claim 3, wherein the material of the cover window is a sapphire material, and wherein the refractive index of the material of the anti-reflection coating is from 1.68 to 1.76.

6. The camera module according to claim 3, wherein the material of the cover window is a transparent organic material.

7. The camera module according to claim 1, wherein a light transmittance of a material of the cover window in a visible light band is not less than 90%.

8. The camera module according to claim 1, wherein when the anti-reflection coating is on the at least one surface of the infrared cut-off filter, the light passes through a third surface of the infrared cut-off filter and a fourth surface opposite to the third surface, and wherein the anti-reflection coating is on either the third surface or the fourth surface or both.

9. The camera module according to claim 8, wherein a refractive index of a material of the anti-reflection coating is close to a refractive index of a material of the infrared cut-off filter.

10. The camera module according to claim 1, wherein the anti-reflection coating further comprises a residual layer, wherein the residual layer and the conical anti-reflection structures are integrated into a whole, and wherein a thickness of the residual layer is less than or equal to 200 nm.

11. A camera module, comprising at least one lens and an anti-reflection coating, wherein the anti-reflection coating is on at least one flat surface, through which light passes, of the at least one lens; wherein the anti-reflection coating comprises conical anti-reflection structures, wherein a bottom diameter of the conical anti-reflection structure is 40 nm to 150 nm, wherein a top diameter of the conical anti-reflection structure is 0% to 30% of the bottom diameter, wherein a height of the conical anti-reflection structure is 150 nm to 300 nm, and wherein a spacing between two adjacent conical anti-reflection structures is ⅕ to ⅓ of a wavelength in a visible light band.

12. The camera module according to claim 11, wherein the anti-reflection coating further comprises a residual layer, wherein the residual layer and the conical anti-reflection structures are integrated into a whole, and wherein a thickness of the residual layer is less than or equal to 200 nm.

13. A terminal, comprising:
a display screen;
a memory; and
a processor coupled to the memory, and the display screen; and
a camera coupled to the processor, wherein the camera comprises:
  a cover window at a first end of the camera module;
  an infrared cut-off filter at a second end of the camera module; and
  an anti reflection coating,
wherein the anti-reflection coating is on at least one surface, through which light passes, of the cover window, or the anti-reflection coating is on at least one surface, through which light passes, of the infrared cut-off filter,
wherein the anti-reflection coating comprises conical anti-reflection structures,
wherein a bottom diameter of the conical anti-reflection structure is 40 nm to 150 nm,
wherein a top diameter of the conical anti-reflection structure is 0% to 30% of the bottom diameter,
wherein a height of the conical anti-reflection structure is 150 nm to 300 nm, and
wherein a spacing between two adjacent conical anti-reflection structures is ⅕ to ⅓ of a wavelength in a visible light band.

14. The terminal according to claim 13, wherein when the anti-reflection coating is on the at least one surface of the cover window, the light passes through a first surface of the cover window and a second surface opposite to the first surface, and wherein the anti-reflection coating is on either the first surface or the second surface or both.

15. The terminal according to claim 14, wherein a refractive index of a material of the anti-reflection coating is close to a refractive index of a material of the cover window.

16. The terminal according to claim 15, wherein the material of the cover window is Gorilla Glass, and wherein the material of the anti-reflection coating is transparent ultraviolet-curable resin or transparent heat-curable resin.

17. The terminal according to claim 15, wherein the material of the cover window is a sapphire material, and wherein the refractive index of the material of the anti-reflection coating is from 1.68 to 1.76.

18. The terminal according to claim 13, wherein when the anti-reflection coating is on the at least one surface of the infrared cut-off filter, the light passes through a third surface of the infrared cut-off filter and a fourth surface opposite to the third surface, and wherein the anti-reflection coating is on either the third surface or the fourth surface or both.

19. The terminal according to claim 18, wherein a refractive index of a material of the anti-reflection coating is close to a refractive index of a material of the infrared cut-off filter.

20. The terminal according to claim 13, wherein the anti-reflection coating further comprises a residual layer, wherein the residual layer and the conical anti-reflection structures are integrated into a whole, and wherein a thickness of the residual layer is less than or equal to 200 nm.

* * * * *